US008640101B2

(12) United States Patent
Spurlin

(10) Patent No.: US 8,640,101 B2
(45) Date of Patent: Jan. 28, 2014

(54) PEDIGREE ANALYSIS FOR SOFTWARE COMPLIANCE MANAGEMENT

(75) Inventor: William Spurlin, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 1988 days.

(21) Appl. No.: 11/765,167

(22) Filed: Jun. 19, 2007

(65) Prior Publication Data

US 2008/0320455 A1 Dec. 25, 2008

(51) Int. Cl.
*G06F 9/44* (2006.01)

(52) U.S. Cl.
USPC .......................................... 717/124; 717/126

(58) Field of Classification Search
USPC .................................. 717/124, 126
See application file for complete search history.

(56) References Cited

U.S. PATENT DOCUMENTS

2006/0059061 A1 * 3/2006 Oey ................................ 705/35

OTHER PUBLICATIONS

Penta, et al. "Who are Source Code Contributers and How do they change?", 2009, IEEE, p. 11-20.*
Copenhaver, Karen: When Code Mixes: Managing Software License Compliance; Redhat Magazine 2007, p. 1-4.
Determine Pedigree Assess Assets Clarify Obligations; Blackduck Software, Inc. 2007, p. 1-2.

* cited by examiner

*Primary Examiner* — Qamrun Nahar
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to source code analysis and provide a novel and non-obvious method, system and computer program product for source code pedigree management. In one embodiment of the invention, a method for source code pedigree management can be provided. The method can include parsing source code to identify copyright rights holders for corresponding copyright constructs, rejecting copyright constructs not associated with corresponding rights holders, compiling a list of the identified copyright rights holders, corresponding copyright statements, and lists of files corresponding to each of the copyright rights holders, and displaying the compiled list.

15 Claims, 2 Drawing Sheets

PEDIGREE ANALYSIS FOR SOFTWARE COMPLIANCE MANAGEMENT

BACKGROUND OF THE INVENTION

1. Field of the Invention

The present invention relates to the field of source code auditing and more particularly to software compliance management.

2. Description of the Related Art

A software code audit is a comprehensive analysis of source code in a programming project with the intent of discovering errors, security vulnerabilities or violations of programming conventions. The source code audit is an integral part of the defensive programming paradigm, which attempts to reduce errors before the software is released. Source code auditors generally perform a line-by-line inspection of programming source code to identify errors, security vulnerabilities and programming convention violations. Once testing and code inspection phases complete, source code auditors often generate a visual report detailing code deficiencies revealed by the analysis.

In a simple development environment for a conventional, stand-alone application, source code auditing primarily concerns itself with the integrity of the code in terms of operability and the avoidance of malware elements. In a complex development environment like a geographically dispersed, multi-developer environment in the mode of open source development, however, code integrity includes not just bug detection but also the detection of non-malicious, albeit unauthorized source code placed into source either intentionally or inadvertently. Further, in a world of consolidation in the technology industry, a merger or acquisition generally involves the commandeering and adoption of source code developed outside the control of the acquiring party. The impact of the presence of such unauthorized source code can result in substantial liability for the publisher of the source and can inhibit the ability for the publisher to commercially distribute the source as part of a larger application.

Specifically, in an era of open source development, it is not uncommon for developers to build upon the efforts of one another. In fact, the notion of borrowing and extending the source of others forms the foundation of the open source movement. The open source license provides the enabler for the open source movement by accounting for the copyrights arising from the source code contributions of individual developers. Yet, oftentimes, an open source license can require a model of software distribution that is largely incompatible with the business model for commercial software publishers. As a result, incorporating open source code unwittingly in a commercial software application can implicitly invoke the terms of an open source license despite the incompatibility of the open source license with the for-profit business model of software publishing.

To account for the risk of open source segments appearing in commercially distributed software, software auditing tools explicitly seek out source code segments of known open source applications. In the most general case, these types of software auditing tools rely upon a database of known text to pattern match against source snippets in code under analysis. Other less automated techniques provide a search interface for text searching and pattern matching to be provided dynamically by an end user. Advanced forms of code analysis utilize a knowledgebase of "code prints" to identify not only source code snippets produced by third parties, but also the licensing obligations attached to those identified code snippets.

One popular way to identify third party source code snippets is to scan source code, using pattern matching and regular expressions, for the copyright statements of others. However, copyright statements vary in nature from "Copyright (c) 2007 All Rights Reserved" to merely "© 2007" and the like. Accordingly, pattern matching using only regular expressions can be challenging and hardly perfect. Additionally, in many cases, merely recognizing the presence of a third party source code snippet is not enough. Rather, the identity of the rights holder can be just as important in that in many cases, an existing licensing agreement with the rights holder may permit the presence of the third party source code snippet to be identified. Finally, scanning every file for a development project can result in an unwieldy listing of "hits", even within files ultimately not resulting in a distributable binary. Pattern matching, usually implemented with regular expressions, results in an inaccurate and too-long list of possible copyright statements and rights holders, and in a large number of false positives.

BRIEF SUMMARY OF THE INVENTION

Embodiments of the present invention address deficiencies of the art in respect to source code analysis and provide a novel and non-obvious method, system and computer program product for source code pedigree management. In one embodiment of the invention, a method for source code pedigree management can include parsing source code to identify copyright rights holders and to identify a list of files associated with each copyright rights holder, and parsing source code to reject copyright constructs not associated with corresponding rights holders, compiling a list of rights holders and corresponding copyright statements and files parsed from the source code, displaying the compiled list, and compiling and displaying a list of rejected copyright constructs. In one aspect of the embodiment, parsing source code to identify copyright rights holders and to identify a list of files associated with each copyright rights holder, and parsing source code to reject copyright constructs not associated with corresponding rights holders can include loading a parser derived from a contextual copyright grammar arranged to recognize copyright statements in the source code and to recognize corresponding rights holders proximately associated with the matched copyright statements, and executing the parser derived from a contextual copyright grammar on the source code through a copyright rights holder location parser.

In another embodiment of the invention, a code compliance data processing system can be provided. The system can include a copyright rights holder grammar, and a pedigree analysis script executing a parser generated from said grammar in a computer system. The script can include a parser arranged to apply the copyright rights holder grammar to source code in order to parse the source code to identify copyright rights holders and to identify a list of files associated with each copyright rights holder and to reject copyright constructs not associated with corresponding rights holders, to compile a list of rights holders, and corresponding copyright statements and files parsed from the source code, to display the compiled list and to compile and display a list of rejected copyright constructs. In one aspect of the embodiment, the grammar can include a date sub-grammar and parser-recognizer, a copyright symbol sub-grammar and parser-recognizer, and a rights holder sub-grammar and parser-recognizer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for source code pedigree management. In accordance with an embodiment of the present invention, one or more source code documents can be parsed in context to identify copyright rights holders and to identify a list of files and a list of copyright statements associated with each copyright rights holder, to reject copyright constructs not associated with a rights holder and to compile and display a list of rejected copyright constructs. The source code documents further can be limited to those source code documents resulting in distributable binaries. When a copyright statement survives filtering and references a rights holder, the copyright statement can be logged in association with a document containing the copyright statement and presented in a summary view of all rights holders and corresponding copyright statements and files.

Figure 1:
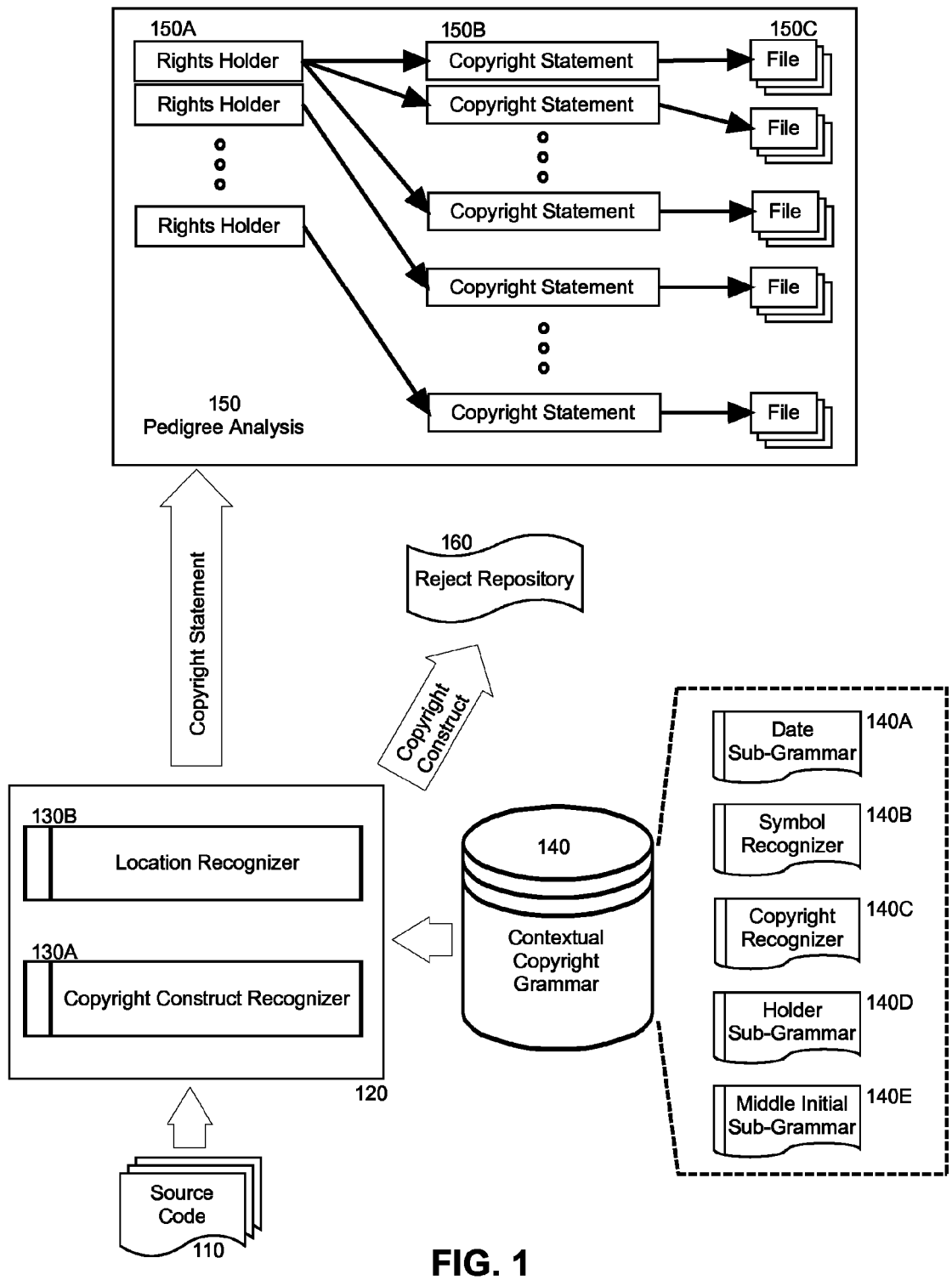
FIG. 1 is a pictorial illustration of a process for source code pedigree management.

In illustration, FIG. 1 is a pictorial illustration of a process for source code pedigree management. As shown in FIG. 1, a parser 120 derived from a contextual copyright grammar 140 can be established for identifying rights holders 150A for copyright statements 150B in source code 110. The parser 120 derived from a contextual copyright grammar 140 can draw on a date sub-grammar 140A, a symbol sub-grammar 140B, a copyright sub-grammar 140C, a rights holder sub-grammar 140D and a middle initial sub-grammar 140E. The date sub-grammar 140A itself can be a parser to recognize different date format patterns to locate a date in source code, whereas the symbol recognizer 140B can provide a parser to recognize different copyright symbols such as (c) or © in source code.

The copyright recognizer 140C can provide a parser to recognize both long and short copyright terms such as "Copyright" or "Copyright by" while the rights holder sub-grammar 140D can provide a parser to extract an identity of a person or entity associated with a copyright statement. Finally, the middle initial sub-grammar 140E can provide a parser to recognize personal names of rights holders and to differentiate middle initials in such personal names from other constructs involving single letters followed by periods. The entirety of the parser derived from a contextual copyright grammar 140 can be embodied in a parser script written in a language such as a PERL (a backronym referring to the Perl programming language and expanding to Practical Extraction and Reporting Language).

The parser 120 derived from a contextual copyright grammar 140 can be applied in connection with one or more source code files 110 by copyright construct recognizer 130A and copyright construct location recognizer 130B to determine first whether or not a snippet of the source code 110 includes a potential copyright statement, and second whether the copyright statement has an associated rights holder. Notably, the parser 120 can filter out those of the source code files 110 not utilized in distributable binaries, such as make files and test code files in order to optimize performance of the pedigree analysis. Thereafter, the processing of the contextual copyright grammar 140 on the source code files 110 can produce a pedigree analysis 150 of copyright rights holders 150A and corresponding copyright statements 150B, and further corresponding source code file references 150C associated with the copyright statements 150B. Optionally, the copyright rights holders 150A and copyright statements 150B can be hyperlinked to respective locations in the source code files 110. Further, those potential code snippets containing either the word "copyright" or one of the embodiments of the copyright symbol, e.g. "©" or (c), are stored in a repository of non-copyright statement constructs 160.

Figure 2:
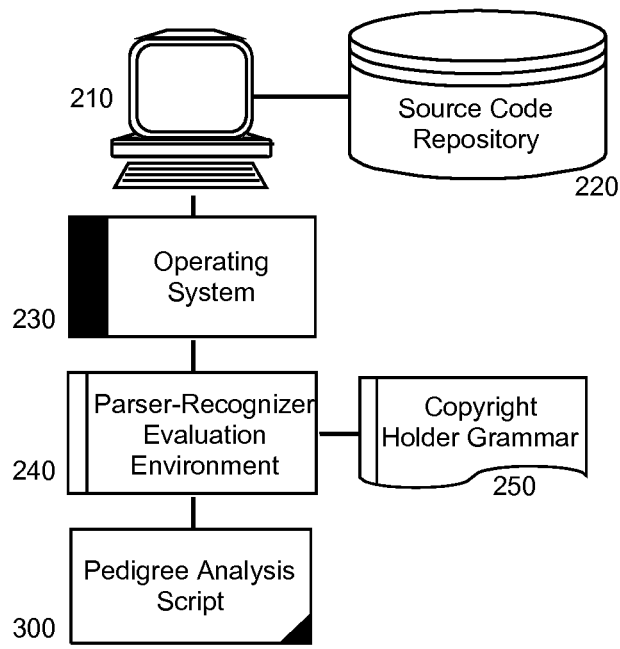
FIG. 2 is a schematic illustration of a code compliance management data processing system configured for source code pedigree management; and, FIG. 3 is a flow chart illustrating a process for source code pedigree management.

The pedigree analysis shown in FIG. 1 can be implemented within a code compliance management data processing system. In this regard, FIG. 2 is a schematic illustration of a code compliance management data processing system configured for source code pedigree management. The system can include a host computing platform 210 operably configured with an operating system 230. The operating system 230 can provide a host operating environment in which application logic can execute utilizing the physical resources of the host computing platform 210 such as a central processing unit (CPU), memory and fixed storage. Finally, a parser-recognizer evaluation environment 240 can be provided to execute in the operating system 240. The parser-recognizer evaluation environment 240 can include program code enabled to process scripts conforming to a dynamic text processing language such as PERL.

Notably, a copyright holder grammar 250 can be provided for interpretation by the parser-recognizer evaluation environment 240. The copyright holder grammar 250 can provide separate scripted parser segments arranged to parse and recognize different contexts in source code to identify sub-grammatical elements such as a date, a copyright symbol, a copyright word or phrase, a personal or entity holder of a copyright positioned proximately to a copyright symbol or word, and can differentiate a middle initial for the personal or entity holder of the copyright from other possible copyright statement constructs. To adequately locate all potential copyright statements in source code, the copyright holder grammar 250 can be strategically configured to capture separate contexts defined as sixteen (16) characters preceding the word copyright or any copyright symbol, and one-hundred and twenty-eight characters following the word copyright or the copyright symbol.

A source code repository 220 can be coupled to the host computing platform 210. The source code repository 220 can include one or more source code files including source files, header files, make files, resource files and the like. A pedigree analysis script 300 can be provided to the parser-recognizer evaluation environment 240. The pedigree analysis script 300 can include program code enabled to select a subset of the source code files in the source code repository 220 limited to those source code files incorporated in a distributable binary while excluding the source code files not incorporated in a distributable binary including make files and test code files. The program code further can be enabled to apply the copyright holder grammar 250 to the subset of the source code files in the source code repository 220 in order to extract copyright statements in the subset that are associated with identifiable rights holders.

Figure 3:
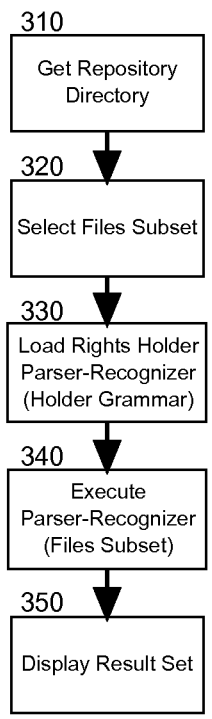

In further illustration, FIG. 3 is a flow chart illustrating a process for source code pedigree management. Beginning in block 310, a repository directory can be retrieved in which one or more source code files can be processed for pedigree analysis. In block 320, a subset of the source code files can be selected so that only those source code files likely to be included in a distributable binary are to be processed for pedigree analysis. Thereafter, in block 330, a rights holder parser-recognizer can be loaded in association with a copyright rights holder grammar. Finally, in block 340 the parser-recognizer can be executed against the files subset and in block 350 the result set for the parser-recognizer can be displayed to indicate a pedigree for different copyright statements located in the subset of source code files.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for source code pedigree management, the method comprising parsing source code to identify copyright rights holders for corresponding copyright constructs;

rejecting copyright constructs not associated with corresponding rights holders;

compiling a list of the identified copyright rights holders, corresponding copyright statements, and lists of files corresponding to each of the copyright rights holders; and, displaying the compiled list.

2. The method of claim 1, wherein parsing source code to identify copyright rights holders for corresponding copyright constructs, comprises:

loading a parser derived from a contextual copyright grammar arranged to parse and recognize copyright statements in the source code and to pattern match corresponding rights holders proximately associated with the matched copyright statements; and, executing the parser derived from a contextual copyright grammar on the source code through a copyright rights holder location recognizer.

3. The method of claim 2, wherein loading a parser derived from a contextual copyright grammar arranged to parse and recognize copyright statements in the source code and to pattern match corresponding rights holders proximately associated with the matched copyright statements, comprises loading a parser derived from a contextual copyright grammar arranged to parse and recognize copyright statements in a segment of the source code and to parse and recognize corresponding rights holders within the segment with the matched copyright statements.

4. The method of claim 2, wherein loading a parser derived from a contextual copyright grammar arranged to parse and recognize copyright statements in the source code and to pattern match corresponding rights holders proximately associated with the matched copyright statements, comprises loading a parser derived from a contextual copyright grammar arranged to parse and recognize copyright statements in a segment of the source code defined by sixteen (16) characters preceding a copyright term or symbol and one hundred and twenty-eight (128) characters following the copyright term or symbol, and to parse and recognize corresponding rights holders within the segment with the matched copyright statements.

5. The method of claim 2, wherein loading a parser derived from a contextual copyright grammar arranged to parse and recognize copyright statements in the source code and to pattern match corresponding rights holders proximately associated with the matched copyright statements, further comprises rejecting copyright constructs that do not contain rights holders proximately associated with the matched copyright statements.

6. The method of claim 5, wherein loading a parser derived from a contextual copyright grammar arranged to parse and recognize copyright statements in the source code and to pattern match corresponding rights holders proximately associated with the matched copyright statements, further comprises placing rejected copyright constructs into a repository of rejected copyright constructs.

7. A code compliance data processing system comprising:

a copyright rights holder grammar; and, a pedigree analysis script executing in a memory of a computer system, the pedigree analysis script comprising a parser-recognizer arranged to apply the copyright rights holder grammar to source code in order to identify copyright rights holders, to identify a list of files associated with each copyright rights holder, to identify a list of copyright statements associated with each copyright rights holder, to reject copyright constructs not associated with corresponding rights holders, to compile lists of files and copyright statements associated with corresponding rights holders parsed from the source code, and to display the compiled lists.

8. The system of claim 7, wherein the copyright rights holder grammar comprises:
   a date sub-grammar;
   a symbol sub-grammar;
   a copyright sub-grammar; and,
   a rights holder sub-grammar.

9. The system of claim 7, wherein the pedigree analysis script comprises a practical extraction and reporting language (PERL) script configured for execution in a parser-recognizer evaluation environment executing in the computer system.

10. A computer program product comprising a non-transitory computer usable storage medium storing computer usable program code for source code pedigree management, the computer program product comprising:
   computer usable program code for parsing source code to identify copyright rights holders for corresponding copyright constructs;
   computer usable program code for rejecting copyright constructs not associated with corresponding rights holders;
   computer usable program code for compiling a list of the identified copyright rights holders, corresponding copyright statements, and lists of files corresponding to each of the copyright rights holders; and,
   computer usable program code for displaying the compiled list.

11. The computer program product of claim 10, wherein parsing source code to identify copyright rights holders for corresponding copyright constructs, comprises:
   loading a parser derived from a contextual copyright grammar arranged to parse and recognize copyright statements in the source code and to pattern match corresponding rights holders proximately associated with the matched copyright statements; and,
   executing the parser derived from a contextual copyright grammar on the source code through a copyright rights holder location recognizer.

12. The computer program product of claim 11, wherein the computer usable program code for loading a parser derived from a contextual copyright grammar arranged to parse and recognize copyright statements in the source code and to pattern match corresponding rights holders proximately associated with the matched copyright statements, comprises computer usable program code for loading a parser derived from a contextual copyright grammar arranged to parse and recognize copyright statements in a segment of the source code and to parse and recognize corresponding rights holders within the segment with the matched copyright statements.

13. The computer program product of claim 11, wherein the computer usable program code for loading a parser derived from a contextual copyright grammar arranged to parse and recognize copyright statements in the source code and to pattern match corresponding rights holders proximately associated with the matched copyright statements, comprises computer usable program code for loading a parser derived from a contextual copyright grammar arranged to parse and recognize copyright statements in a segment of the source code defined by sixteen (16) characters preceding a copyright term or symbol and one hundred and twenty-eight (128) characters following the copyright term or symbol, and to parse and recognize corresponding rights holders within the segment with the matched copyright statements.

14. The computer program product of claim 11, wherein the computer usable program code for loading a parser derived from a contextual copyright grammar arranged to parse and recognize copyright statements in the source code and to pattern match corresponding rights holders proximately associated with the matched copyright statements, further comprises computer usable program code for rejecting copyright constructs that do not contain rights holders proximately associated with the matched copyright statements.

15. The computer program product of claim 14, wherein the computer usable program code for loading a parser derived from a contextual copyright grammar arranged to parse and recognize copyright statements in the source code and to pattern match corresponding rights holders proximately associated with the matched copyright statements, further comprises computer usable program code for placing rejected copyright constructs into a repository of rejected copyright constructs.

* * * * *